United States Patent Office 3,828,048
Patented Aug. 6, 1974

3,828,048
ALKYLSULFONIC DERIVATIVES OF
QUININE ALKALOIDS
Rene Tixier, Paris, France, assignor to Societe Generale de Reserches et d'Applications Scientifiques (Sogeras)
No Drawing. Filed Oct. 14, 1971, Ser. No. 189,106
Claims priority, application Great Britain, Oct. 14, 1970, 48,926/70
Int. Cl. C07d 43/24
U.S. Cl. 260—284    3 Claims

ABSTRACT OF THE DISCLOSURE

Quinine alkaloids such as quinine, quinidine, hydroquinidine and quinicine are reacted with an alkane sultone, such as propane sultone or butane sultone, to form an internal sulfonate which has more acceptable pharmacological properties, especially a reduced toxicity.

---

This invention relates to alkaloid compounds, the preparation thereof and pharmaceutical compositions containing them. It has now been found, in accordance with the invention, that certain derivatives of the quinine alkaloids possess interesting properties in that whilst generally retaining the properties of the parent quinine alkaloid, they possess more acceptable pharmacological properties, especially a reduced toxicity.

The new compounds of the invention are the reaction products of quinine alkaloids and alkane-sultones and may be regarded as a class of sulfobetaines. The term "quinine alkaloids" is intended to cover quinine and the related alkaloids which may be extracted from cinchona bark as well as their semi synthetic derivatives. Examples of the quinine alkaloids which may be reacted with an alkane sultone in accordance with the invention include, for example, quinine, quinidine, hydroquinidine and quinicine.

The alkane sultones which may be used in accordance with the invention may be represented by the general formula:

in which $n$ is an intger and particularly suitable alkane sultones are propane sultone having the formula:

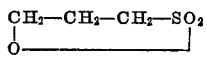

and butane sultone having the formula:

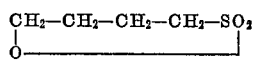

It is known that alkane sultones react with compounds containing a hydroxyl group or a trivalent nitrogen atom to give addition compounds having various properties. We have now found, in accordance with the present invention, that the alkane sultones may be reacted with quinine alkaloids to give new compounds which are, in general, more soluble, more active and less toxic than the starting alkaloids.

The reaction between the quinine alkaloid and the alkane sultone is conveniently carried out in the presence of an inert solvent, such as acetone or methyl ethyl ketone, at room temperature or below, using an excess of the alkane sultone with respect to the quinine alkaloid. It has been found that the use of methyl ethyl ketone as inert organic solvent gives particularly good results, and better than these are achieved with acetone.

The structure of the quinine alkaloid derivatives according to the invention may take two forms.

Thus, where the derivative is derived from quinine, quinidine or hydroquinidine it may be represented by the formula:

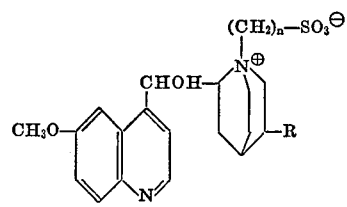

in which $n$ is th number of carbon atoms in the starting sultone (i.e. 3 in the case of propane sultone or 4 in the case of butane sultone) and R represents a group —CH=CH$_2$ (in the case of quinidine or quinine) or a group —CH$_2$—CH$_3$ (in the case of hydroquinidine).

In this case the derivatives are obtained in the form of internal sulphonates of a quaternary nitrogen atom and may be derived, for example in the case of quinidine, as an N-propylquinidinium internal sulfonate.

Where the derivative is derived from quinicine it may be represented by the formula:

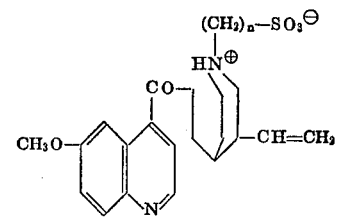

in which $n$ has the meaning defined above.

As stated above, the new compounds of the invention have interesting pharmacological properties in that they generally retain the activity of the starting alkaloid whilst having improved properties, namely reduced toxicity.

Accordingly, a further embodiment of the invention provides a pharmaceutical composition comprising a new compound in accordance with the invention in association with a pharmaceutical carrier or diluent. The pharmaceutical compositions of the invention will normally be presented in conventional form, for example as a solution for injection comprising the active ingredient dissolved in sterile, pyrogen-free water. The compositions of the invention may also be formulated for oral administration for example, as pills, dragees, tablets or like solid formulations or as syrups or linctuses.

In order that the invention may be well understood the following Examples are given by way of illustration only.

EXAMPLE 1

16 Grams of propane sultone were dissolved in 0.400 liters of methyl ethyl ketone and there were added thereto 21 grams of quinine base. The mixture was stirred on a water bath at 40° C. until the quinine had dissolved and the warm solution was then filtered. The filtered solution was then allowed to stand and after standing overnight, the desired end product, internal N-propylquininium sulfonate, began to crystallize out. The reaction mixture was allowed to stand for at least 5 days to permit crystallization of the desired product, after which, the crystals were filtered off, dried, washed with a little methyl ethyl ketone and then dried again.

In order to obtain a pure product, the dried crystals were added to 200 ml. of a mixture of equal volumes of methanol and water and the whole heated, on a water bath, to 60° C. until the product had dissolved. The solution was then filtered to give a perfectly clear solution and there was then added dropwise with agitation 300 ml. of demineralized water. The resultant mixture was allowed to stand overnight at a temperature of about 4° and the resultant precipitate filtered off, dried, washed with a little water and finally dried under reduced pressure at about 50° C. to give 21 grams of product.

The product was a white crystalline powder, insoluble in water, acetone, chloroform and ether and soluble in methanol, ethanol and dilute acid and alkaline solutions. The product is a mono propyl sulfonate compound, having the molecular formula $$C_{23}H_{30}N_2O_5S.$$

The theoretical quinine content is 72.7% (found 72.4%) and the theoretical sulfur content is 7.1% (found 7.3%).

EXAMPLE 2

24 Grams of propane sultone were dissolved in 0.450 liters of methyl ethyl ketone and 32 grams of quinidine base were added to the solution. The reaction mixture was then stirred on a water bath at 40° C. until the quinidine dissolved and the solution filtered hot. The reaction mixture was then allowed to stand for at least 5 days to allow for precipitation of crystals of internal N-propylquinidinium sulfonate, which precipitation started after the reaction mixture had been allowed to stand overnight. The precipitated crystals were recovered from the reaction mixture, washed with a little methyl ethyl ketone, and dried.

The product was purified by dissolving the crystals in 300 ml. of methanol on a water bath at about 40° C. The solution was filtered and then 50 ml. of demineralized water was slowly added to the clear filtrate with gentle stirring. The mixture was allowed to stand at about 4° C. to allow for crystallization of the product, the crystals were filtered off, dried, washed with a little demineralized water, and finally dried under reduced pressure at a temperature of about 50° C. to give 33 grams of product.

The product obtained was a crystalline white powder, insoluble in water, acetone, chloroform and ether and is soluble in methanol, slightly soluble in ethanol, insoluble in dilute alkaline solutions but soluble in acid solutions The product is a monopropylsulfonate compound having the molecular formula:

$$C_{23}H_{30}N_2O_5S.$$

The product has a theoretical quinidine content of 72.7% (found 72.6%) and a theoretical sulfur content of 7.1% (found 7.25%).

EXAMPLE 3

16 Grams of hydroquinidine base and 12 grams of propane sultone were dissolved in 0.480 liter of methyl ethyl ketone on a water bath at 40° C. The reaction mixture was filtered and then allowed to stand in the dark for at least 5 days at room temperature to allow for the formation of the precipitate. The precipitate was then separated from the reaction mixture, dried, washed with a little methyl ethyl ketone and finally dried. This product was purified by dissolving it in a mixture of ethanol (200 ml.) and water (60 ml.) over a water bath at 70° C. The reaction mixture was then allowed to stand at room temperature overnight and the precipitate formed was filtered off, and dried under reduced pressure at about 60° C. to give 14 grams of product.

The product obtained was a crystalline white powder, insoluble in water, ethanol, acetone and ether, partly soluble in methanol, slightly soluble in chloroform and soluble in aqueous ethanol or methanol.

The product is a monopropylsulfonate compound having the molecular formula:

$$C_{23}H_{32}N_2O_5S.$$

The product has a theoretical hydroquinidine content of 69.4% (found: 69.2%) and a theoretical sulfur content of 7.2% (found 7.2%).

EXAMPLE 4

9 Grams of quinicine base were dissolved in 10 ml. of methyl ethyl ketone and 6.5 grams of propane sultone were dissolved in 5 ml. of methyl ethyl ketone. The two solutions were mixed with cooling since the reaction between the two reactants was exothermic. The reaction mixture was allowed to stand for three days after which the precipitate which formed was decanted off and taken up in 50 ml. of diethyl ether. The product which formed was filtered off and dried under reduced pressure at about 50° C. to give 11 grams of product.

The product was a white powder, soluble in water, and insoluble in acetone and ether. The product has a molecular formula:

$$C_{23}H_{30}N_2O_5S.$$

The theoretical quinicine content is 72.7% (found 72.5%) and a theoretical sulfur content of 7.17% (found 6.9%).

EXAMPLE 5

5.5 ml. of butane sultone were dissolved in 50 ml. of methyl ethyl ketone and then 10 grams of quinidine base were added thereto. The mixture was then heated at reflux for 16 hours with stirring. The precipitate which formed was recovered by filtration, washed with a little methyl ethyl ketone and then dried.

In order to obtain a pure product, the crystalline product was dissolved in 80 ml. of methanol and 65 ml. of water were added to the solution which was then allowed to stand at 4° C. for 1 hour. The resultant crystals were dried, washed with a little water, and finally dried under reduced pressure at 50° C. to give 10 grams of product.

The product was a white crystalline powder, soluble in methanol but insoluble in water, acetone, chloroform and ether. The product has a molecular formula:

$$C_{24}H_{32}N_2O_5S$$

and has a theoretical quindine content of 70.5% (found: 70.7%) and a theoretical sulfur content of 6.96% (found: 6.91%).

EXAMPLE 6

8.5 ml. of butane sultone were dissolved in 200 ml. of methyl ethyl ketone and then 7 grams of hydroquindine base were added thereto. The mixture was then heated at reflux for 16 hours with stirring. The precipitate which formed was filtered off, washed with a little methyl ethyl ketone and then dried.

In order to obtain a pure product, the crystals were dissolved in 120 ml. of warm methanol, the solution was filtered and then 150 ml. of water were added to the filtered solution. The resultant solution was allowed to stand overnight at 4° C. and the crystals were then recovered by filtration, washed with a little water and finally dried under reduced pressure at 50° C. to give 4 grams of product.

The product was a white crystalline powder, soluble in methanol but insoluble in water, ether, chloroform and acetone. The product has the molecular formula:

$$C_{24}H_{34}N_2O_5S$$

a theoretical hydroquinidine content of 70.6% (found 70.6%) and a theoretical sulfur content of 6.92% (found 6.99%).

The new compounds of the invention have the following pharmacological properties.

The internal N-propyl- or N-butyl-quinidinium sulfonates and the corresponding derivatives from hydroquinidine possess an important antagonistic activity against the electrocardiographic anomalies provoked in the rat by aconitine (method of Hass and Busch-Arzneim Forsch. 18, (1968) No. 1).

The acute toxicity of the internal sulfonates (as determined by the method of Diechmann-J. Ind. Hyg. Toxicol. 25, 415, 1943) shows a net decrease of that of the corresponding alkaloids. The therapeutic index of the products of the invention is, therefore, better than that of quinidine or hydroquinidine.

N-propylquininium internal sulfonate has a net antipyretic activity against pyrexia induced in the rabbit by the method of Cheymol (C. A. Soc. Biol. 149, 338, 1955). The curve induced by the sub-cutaneous injection of 150 ml. per kilogram of the product (Example 1) is the same as that produced by the same dose of quinine chlorhydrate. The theoretical quinine content of the products of Example 1 is 72.4% so that the activity of the product is markedly better than that of quinine.

To sum up, the products of the invention possess the same pharmacological properties as the corresponding alkaloids from which they are derived but are, in general, more active than these latter.

What is claimed is:

1. An alkaloid compound selected from the group consisting of internal propyl and butyl sulfonates of quinine, quinidine, hydroquinidine and quincine or a pharmaceutically acceptable salt thereof.

2. An alkaloid compound as claimed in claim 1 wherein the quinine alkaloid is quinidine and the alkane sultone is propane sultone.

3. An alkaloid compound as claimed in claim 1 wherein the quinine alkaloid is quinidine and the alkane sultone is butane sultone.

References Cited

UNITED STATES PATENTS 3,005,755    10/1961    Schoen _____ 260—284

DONALD G. DAUS, Primary Examiner

U.S. Cl. X.R.

424—259; 260—327 B